May 6, 1969　　T. N. LINDENMUTH ET AL　　3,443,093
DENTAL X-RAY PACKET HAVING A UNIFORM OVERALL
THICKNESS AND METHOD OF MAKING SAME
Filed July 7, 1966
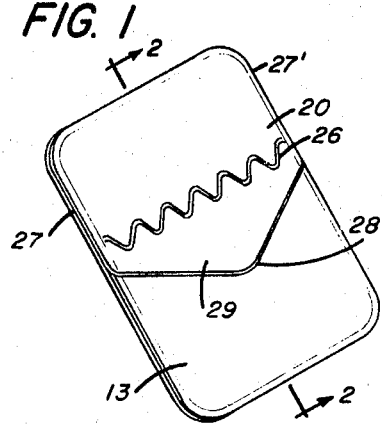
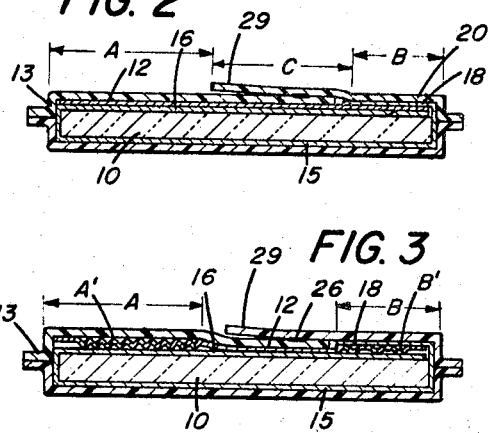
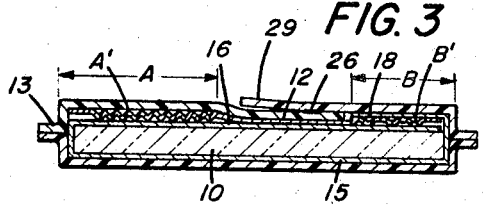
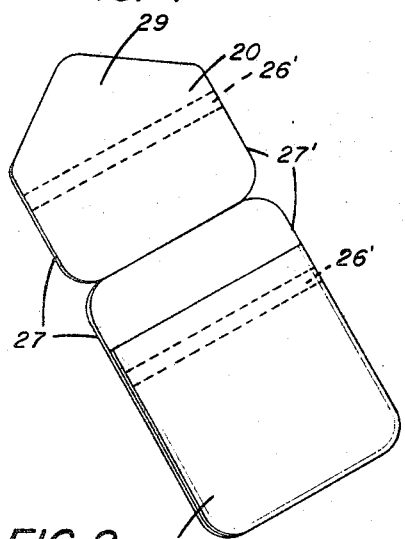
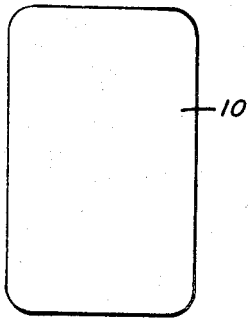
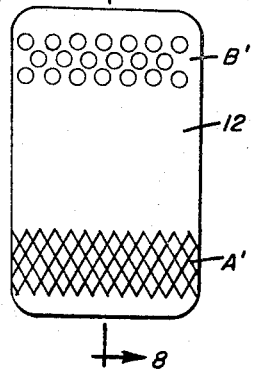
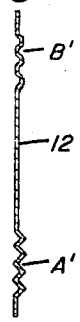
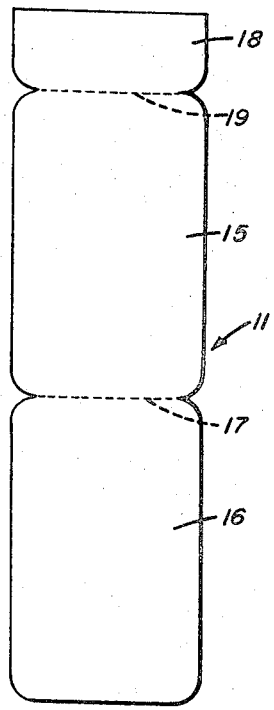
TERRY N. LINDENMUTH
CHARLES W. PIERSON
INVENTORS
BY
ATTORNEYS

# United States Patent Office 3,443,093
Patented May 6, 1969

3,443,093
DENTAL X-RAY PACKET HAVING A UNIFORM OVERALL THICKNESS AND METHOD OF MAKING SAME
Terry N. Lindenmuth and Charles W. Pierson, Rochester, N.Y., assignors to Eastman Kodak Company, Rochester, N.Y., a corporation of New Jersey
Filed July 7, 1966, Ser. No. 563,532
Int. Cl. G01n 23/04; H01j 37/22; B65d 85/48
U.S. Cl. 250—69                                6 Claims

ABSTRACT OF THE DISCLOSURE

Conventional dental X-ray film packs which vary in overall thickness at different portions along their length by reason of a difference in the number of layers of material resulting from the package structure, have the metal foil thereof knurled or embossed to different depths at the thinner portions to increase the thickness of those portions to that of the thickest portion so that the overall thickness of the entire pack is substantially the same. This improves the stacking properties of such packs and prevents them from jamming up in the discharge slots of dispensers provided for dispensing them one at a time from a stack.

---

This invention relates to an improvement in X-ray film packages, and particularly dental X-ray film packages and their manufacture.

Dental X-ray film packages on the market today consist of one or two pieces of sensitive film in a small sealed envelope or flat package ready to be placed in the mouth of a patient for exposure to X-rays. They ordinarily contain a thin sheet of metal foil of the same size as the film which is separated from the film by a layer of paper or other suitable material to prevent direct contact between the metal foil and the film. In one of the better known dental X-ray packages this separator between the film and metal foil takes the form of a black paper wrapper which is folded lengthwise over both surfaces of the film and against one surface of which the metal foil is placed. To facilitate removal of the film from the package for processing after its exposure this black paper wrapper has a pull tab on one end which folds down over the top edge of the film in overlapping relation with the metal foil and the top edge of the wrapper spacing the foil from the film. This assemblage of film, black paper wrap and metal foil is then slipped into the open end of a plastic envelope having a foldable flap which can be folded down and sealed to provide a moisture and light-tight closure for the film. The seal for the foldable flap is made at a point removed from the free end of the flap to leave a pull tab which can be gripped and pulled upwardly to break the seal of the flap for opening the envelope so that after exposure the film can be pulled out for processing.

This dental X-ray package design has presented several problems because of a variation in the overall thickness of the package at different portions along its length. The package is thickest in the cross-seal and pull tab area at the center of the package because of the triple thickness of the material forming parts of the envelope. The top portion of the package is thinner than the central portion because there are only two layers of envelope material in this area instead of three, but it is thicker than the bottom portion of the package because of the presence of the folded-down pull tab on the black paper wrapper. Since these dental X-ray packages are customarily stacked and banded in bundles of 150 for marketing, these variations in overall thickness of each package present the following problems: (1) the 150 package bundle is unstable and difficult to handle and (2) due to banding of the bundle the excessive thickness in the cross-seal and pull tab area causes a film sensitization mark to appear across each film after processing due to the pressure applied to this portion of the package. Another problem encountered by the described dental X-ray package arises by reason of the fact that the end portions thereof are thinner than other well known, easy-opening dental X-ray packets on the market, and for which dispensers have been supplied into which a stack of some 150 packets are placed in the top of the dispenser to be removed one at a time from the bottom of the stack through a slot in the dispenser which is just wide enough to allow the passage of one packet at a time. Because the above-described dental X-ray packages are thinner at the end than the known easy-opening dental X-ray packets, it is possible for two packages to simultaneously move into the discharge slot of the dispenser and cause a jam-up because their combined thickness at their cross-seal and pull tab areas is too great to pass through the slot.

The primary object of the present invention is to provide an improved dental X-ray package and a method for making the same which overcomes the above-noted disadvantages of known designs.

A further object is to make the overall thickness of the dental X-ray package substantially equal at all areas or portions thereof by increasing the thickness at the thinner portions to that of the thickest portion which is dictated by the design of the closure for the envelope.

Still another object of this invention is to make this adjustment in package thickness by knurling or embossing the metal foil to different depths at selected areas rather than requiring the use of additional or different materials. This results in lower cost and less material handling.

The novel features that we consider characteristic of our invention are set forth with particularity in the appended claims. The invention itself, however, both as to its organization and its method of fabrication, together with additional objects and advantages thereof, will best be understood from the following description when read in connection with the accompanying drawings in which:

FIG. 1 is a perspective view of a complete dental X-ray packet fabricated in accordance with the present invention or in accordance with a known technique, FIG. 2 is a cross-section taken on line 2—2 of FIG. 1 and showing, on an exaggerated scale, how the overall thickness of this package made in a known manner varies from portion to portion along the length of the package, FIG. 3 is a cross-section similar to FIG. 2 but showing how this package is modified according to the present invention to make the overall thickness of the package uniform throughout its length, FIG. 4 is a perspective view of the plastic envelope in an open condition, FIG. 5 is a plan view of black paper inner wrap in an unfolded condition, FIG. 6 is a plan view of the sheet of film, FIG. 7 is a plan view of the sheet of metal foil, and FIG. 8 is an enlarged sectional view taken substantially on line 8—8 of FIG. 7 to show how the depth of the knurling or embossing is varied in accordance with the present invention.

Generally speaking, in accordance with the present invention the sheet of metal foil of a known dental X-ray packet is embossed or knurled in those areas in which the overall thickness of the packet is less than the thickest portion of the packet, and the depth of the knurling or embossing is varied so that each of the thinner portions of the packet is increased in thickness to be equally thick and at least as thick as the thickest portion of the packet. As a result, when these packets are stacked and banded in bundles of 150 for sale, such packaging operation, and the loading of the unbanded stack into a dispenser, is made easier because a more stable stack is provided. Also, pressure sensitization marks on the film due to the thicker cross-seal and pull tab area are eliminated. Also, increasing the thickness of the ends of the packet in this manner accommodate this new packet for use in existing dispensers having a discharge slot whose depth is compatible with existing easy-opening dental X-ray packets which are thicker than the end portions of this new packet. In addition to giving these noted advantages, these knurled or embossed areas of the metal foil cause a density pattern to be produced on the exposed film to identify when the exposure is made through the metal foil, or the wrong side of the package; a feature provided in existing packages by a herringbone shaped knurled pattern made in the metal foil at any place along its length.

Referring now to the drawings, FIG. 1 shows the external appearances of a complete well-known dental X-ray packet as well as the same packet modified in accordance with the present invention. Such a view is shown not only to illustrate that it is not readily apparent from an external comparison of the two packets what undesirable physical characteristics the known packet has, and which the modified packet overcomes so far as packaging and handling of the packets in bundles is concerned, but to illustrate that the modified package retains all of the desirable attributes of the known packet, e.g., small size, thickness, readily openable, moisture proof envelope, etc.

The components of both the known dental X-ray packet and the one modified in accordance with the present invention are essentially the same and comprise a sheet of X-ray film 10 (FIG. 6) which may have a sensitive emulsion on one or both sides as is well known in the art; a strip of black interleaving paper wrap 11 of the shape shown in FIG. 5; a sheet of metal foil 12 substantially the same shape and size as the sheet of film as shown in FIG. 7; and an open ended envelope 13, preferably plastic, within which the other components can be hermetically sealed. As is well known, the envelope 13 may be made of a duplex plastic sheet, a sheet of white plastic laminated to a sheet of black plastic, and the black plastic side being on the inside of the envelope. The plastic preferred for use in making the envelope is polyvinylchloride, although polyethylene, Pliofilm, cryovac or other plastic films or combinations of plastics might also suffice. The exposed white face of the envelope may be matte, glossy, or of embossed design. The metal foil 12 is preferably lead as presently used in most well-known dental X-ray packets, but any metal which will absorb X-rays satisfactorily for radiographic techniques may be used.

In assembling the packet shown in FIG. 1, the sheet of film 10 is centered in the central section 15 of the interleaving paper wrapper 11 and then section 16 of the wrapper is folded up at fold line 17 and over the other face of the film. The sheet of metal foil 12 is then placed on top of the section 16 of the wrapper and the short tab 18 of the wrapper is folded at fold line 19 down and over the top edge of the film and on top of the metal foil. This inner package is then slipped into the open end of the envelope 13 and then the flap 20 of the envelope is folded down and tack sealed transversely of the packet, as indicated at undulated line 26 in FIG. 1 embracing the area indicated at 26' in FIG. 4, and at a point spaced from the tip 28 of the flap 20 to leave a free pull tab 29. After, or at the same time as the flap is being cross-sealed in a closed position the longitudinal edges 27 and 27' of the flap above the cross-seal may be hermetically sealed to the peripheral edge of the front of the envelope in any suitable manner, e.g., heat or ultrasonics if the plastic of the envelope is thermoplastic, by an adhesive, etc.

To open the packet after exposure for processing the film, the technician grasps the free pull tab 29 and pulls the flap 20 up and away from the envelope to break the cross-seal and rip open the seal along the longitudinal edges of the flap. After the envelope is thus opened, the technician grasps the short tab 18 of the interleaving wrapper and uses it to pull the sheet of film from the opened packet. The film will be removed from the packet still between the sections 15 and 16 of the interleaving wrapper.

Reference is now made to FIG. 2 wherein the size, particularly the thickness, of the components making up an existing dental X-ray packet have been greatly exaggerated to illustrate how the overall thickness of the packet varies lengthwise thereof. First of all, the bottom portion of the packet, or that to the left of the flap 20 and designated by the dimension A, is the thinnest portion of the packet since it embraces two layers of plastic forming the front and rear walls of the envelope 13, two layers of the interleaving wrapper 11, the sheet of metal foil 12 and the film 10. The top portion of the packet designated by the dimension B is the next thickest because in addition to the layers making up the thickness of the bottom portion described there is an added layer of interleaving paper introduced by the pull tab 18. Finally, the center portion, or cross-seal and pull tab area of the packet, designated by the dimension C, is the thickest because the pull tab 29 of flap 20 adds a third layer of plastic material to this portion of the packet. Inasmuch as the plastic material is thicker than the interleaving paper the upper portion of the packet will be thinner than the center portion by an amount equal to the difference in thickness between these two materials.

With these differences in overall thickness along the length of the packet may seem insignificant, and do not adversely affect the utility of the individual packets, they have been found to be the cause of a serious problem because of the nature in which these packets are packaged for marketing. When these dental X-ray packets are packaged for marketing they are stacked in bundles of 150 and are held together with a banding tape. Because the packets are thicker in the cross-seal and pull tab area (C) they have a tendency to tip when stacked and this makes the banding of the bundle difficult. Also, when the bundle is unbanded for insertion as a loose stack into a dispenser, the stack of packets tend to collapse thus complicating the insertion of a stack into the open top of a dispenser. Another, and more serious problem, arising by reason of this variation in packet thickness is that when the packets are bundled and banded an excessive pressure is applied to each packet in the thicker cross-seal and pull tab area (C) causing a sensitization mark to appear across the film when it is processed. This sensitization mark, can, and often does, confuse the image exposed on the film and makes a proper diagnosis difficult even when the technician is aware of its presence.

Another problem encountered with this particular dental X-ray packet as shown in FIG. 2 is that it is thinner particularly at the end designated by dimension A, than other commercially available easy-opening dental X-ray packets for which dispensers have been provided. As mentioned above, these dispensers accept a stack of 150 packets into an open top and have a discharge slot in one side at the bottom whose depth is substantially equal to the thickness of a dental packet so that only one packet can be pulled therefrom at a time. With these thinner new packets it has been found that if the stack is put in the dispenser with the thinnest end (A) toward the side of the dispenser having the discharge slot then it is possible for two successive packets to enter the slot at one time and then become jammed because the combined thickness of the two at their cross-seal and pull tab areas (C) is greater than the depth of the slot.

In accordance with the present invention these disadvantages in existing dental X-ray packets are eliminated by increasing the thickness of the two end portions (A) and (B) of the packet to a thickness equal to or slightly greater than the thickness of the cross-seal and pull tab area (C). This modification not only stabilizes the stack of packets by eliminating the tendency of the stack to tip when being bundled, but it eliminates the above-mentioned pressure sensitization mark in the cross-seal and pull tab area by distributing the pressure due to banding more evenly over a larger surface area. Also, the thickness of the ends of the packets is increased so that they can be handled by available dispensers without jamming.

According to the present invention this selective increase in thickness of the thinner portions of the packet is accomplished by deep knurling or embossing the sheet of metal foil rather than adding layers of material to these portions. Looking at FIGS. 3, 7 and 8 it will be seen that the ends of the metal foil 12 are knurled or embossed at areas A' and B' while the center portion of the metal foil corresponding to the cross-seal and pull tab area of the packet is not knurled. The depth of the knurling at these areas A' and B', and corresponding to the thinner portions of the packet designated at A and B in FIG. 2, is made deep enough to increase the thickness of these portions of the packet to be substantially equal to each other and equal to or slightly greater than the thickness of the cross-seal and pull tab area (C). This means that the depth of the knurling at area A' must be greater than the depth of the knurling at area B' because at area A' two thicknesses of plastic envelope material at the cross-seal and pull tab area (C) must be accounted for, whereas, at area B' only one thickness of plastic material and one thickness of interleaving paper (pull tab 18) must be accounted for. Ordinarily, the plastic material from which the envelope 13 is made will be slightly thicker than the interleaving paper 11.

Looking at FIG. 3 it will be seen that the overall thickness of the dental packet made in accordance with the present invention is substantially the same at all portions throughout its length. An alternative to deep knurling the end portions A' and B' of the metal foil by amounts necessary to make the thickness of the ends of the packet equal to that of the cross-seal and pull tab area (C) is to deep knurl these end areas of the metal foil by amounts which will make the thickness of the end portions of the packet slightly greater than the thickness of the cross-seal and pull tab area (C), but equal to each other.

Through testing, we have found that when using a 0.0025 inch thick lead foil as the metal foil 12 a knurl depth of 0.025 inch provides questionable back scatter protection to the film because portions of the lead have been made too thin. At this depth, the lead knurling also loses some of its physical strength and has a tendency to collapse when subjected to the pressure incidental to packaging and use. We have also found that a greater knurl depth could be tolerated from the standpoint of back scatter protection if the points of the knurl are placed toward the film. If the metal foil is lead foil 0.0025 inch thick, we have found that a maximum knurl depth of 0.020 inch will then give adequate back scatter protection and will also display adequate physical strength. The maximum knurl depth may be different for different lead foil thicknesses. The exact depth of the knurl below the maximum depends upon the thickness of the other packet materials. For example, film packets including two sheets of film instead of one would require a shallower knurl. Changes in material thickness for reasons of cost or quality might require the selection of a different knurl depth.

The amount of area of the metal foil that is knurled should be as large as possible in order to distribute the pressures caused by packaging as uniformly as possible over the packet surface. While we have shown both a diamond shaped and hemispherically shaped knurl pattern being used at opposite ends of the same metal foil, the same knurl design can be used at both ends. Also, different knurl designs have been tried and have been found satisfactory. It will be obvious that one advantage of using deep knurling of the metal foil is that increased packet thickness is obtained without the use of additional materials. This results in lower material cost and less material handling. Also, this deep knurling will provide differential exposure for identifying packets that have been exposed from the wrong side of the packet just as does the herringbone pattern which is embossed in the metal foil of known packets solely for this purpose.

Although throughout the specification and claim we have generally referred to the thickening of the metal foil as being accomplished by a knurling operation, and have referred to the thickened portion as a knurled portion, it is to be understood that this result could be accomplished by operations known by other terms, e.g., embossing, embossed portions, etc., so long as the sheet of metal foil is deformed laterally relative to its normal plane without rupturing it such as in perforating. Accordingly, the terms knurling and knurled portion as used in this specification and the claims appended thereto are intended to define any metal working operation and pattern produced in the sheet of metal foil thereby as the result of a sheet of metal being deformed laterally from its normal plane without perforating the same.

We claim:

1. A dental X-ray film package comprising a sheet of sensitized film, a sheet of metal foil upon one side of said sheet of film and coextensive therewith, a light-tight wrapper completely enclosing said sheets of film and metal foil in such a way as to form a completed package whose thickness would vary at different portions by reason of the presence of a different number of layers of material at said different portions, and a knurling in portions of said metal foil coextensive with the thinner portions of said package, the depth of said knurling being such as to increase the thickness of said thinner portions to substantially that of the thickest portion of said package.

2. A dental X-ray film package according to claim 1, in which the high points of the knurling extend from the same face of the metal foil and are directed toward the sensitized film.

3. A dental X-ray film package according to claim 1 in which said metal foil is 0.0025" thick and the depth of said knurling is no greater than 0.020".

4. A dental X-ray film package comprising a sheet of sensitized film, a paper wrapper folded lengthwise around said sheet of film to completely cover both faces thereof and having a pull tab connected to one end and which pull tab folds down over the end of said film and overlaps a portion of the wrapper on one side of said film; a sheet of metal foil coextensive with one side of the film and in face-to-face contact with that surface of the wrapper facing away from said one side of the film; an open-ended plastic envelope into which the assembled sheet of wrapped film and metal foil is inserted; a closing flap hinged to one side of said envelope at the open end thereof to fold down and be adhesively attached to the back panel of said envelope to close the open end thereof; and knurling on those portions of said metal foil coextensive with the pull tab on said paper wrapper and with that end of the envelope not covered by said closing flap, the depth of the knurling at each of said portions being such as to increase the thickness of those portions of the package to make them substantially as thick as the thickest portion of said package defined by the sealed area of the closing flap.

5. In the method of making an X-ray film package comprising a sheet of sensitized film and a sheet of metal foil coextensive therewith confined in superposed relation within an openable light-tight wrapping so formed that a given area of the package has an overall thickness greater than the remaining area of the package by reason of the presence of a lesser number of layers of material at said remaining area, the step of embossing portions of said metal foil coextensive with said remaining area of the package to a depth necessary to increase the overall thickness of the package at said remaining area to at least the overall thickness of the package at said given area.

6. In the method of making an X-ray film package comprising a sheet of sensitized film and a sheet of metal foil coextensive therewith confined in superposed relation within an openable light-tight envelope closed by a hinged flap adhesively sealed to one panel in overlapping relation therewith and provided with a free pull tab which can be gripped and pulled to rupture said seal and open said flap, the step of knurling those portions of said lead foil not coextensive with the seal and pull tab area of said flap to a depth necessary to increase the overall thickness of the package at those portions to at least the thickness of the package at the pull tab and seal area thereof.

References Cited
UNITED STATES PATENTS
3,309,520    3/1967    Cugini _____ 250—69

FOREIGN PATENTS
423,809    2/1935    Great Britain.
566,269    12/1944    Great Britain.

RALPH G. NILSON, *Primary Examiner.*
A. L. BIRCH, *Assistant Examiner.*

U.S. Cl. X.R.
206—62